US 7,390,406 B2

(12) United States Patent
Traubenberg et al.

(10) Patent No.: US 7,390,406 B2
(45) Date of Patent: Jun. 24, 2008

(54) FLUID TREATMENT SYSTEM AND RADIATION SOURCES MODULE FOR USE THEREIN

(75) Inventors: George A. Traubenberg, London (CA); Jason J. Cerny, London (CA); Mike Marcu, Hamilton (CA); Michael P. Sarchese, Belmont (CA); David E. Sproule, Carlisle (CA)

(73) Assignee: Trojan Technologies Inc. (CA)

( * ) Notice: Subject to any disclaimer, the term of this patent is extended or adjusted under 35 U.S.C. 154(b) by 801 days.

(21) Appl. No.: 10/014,898

(22) Filed: Dec. 14, 2001

(65) Prior Publication Data

US 2002/0113021 A1    Aug. 22, 2002

Related U.S. Application Data

(60) Provisional application No. 60/255,384, filed on Dec. 15, 2000.

(51) Int. Cl.
*C02F 1/32* (2006.01)
(52) U.S. Cl. ............ 210/232; 210/198.1; 210/748; 422/186.3
(58) Field of Classification Search .......... 210/232, 210/748, 198.1; 422/186, 186.3; 250/432, 250/494.1
See application file for complete search history.

(56) References Cited

U.S. PATENT DOCUMENTS

| 4,367,410 A | * | 1/1983 | Wood | 250/431 |
| 4,482,809 A | * | 11/1984 | Maarschalkerweerd | 250/436 |
| 4,872,980 A | * | 10/1989 | Maarschalkerweerd | 210/243 |
| 4,899,056 A | * | 2/1990 | Ellner | 250/431 |
| 5,006,244 A | * | 4/1991 | Maarschalkerweerd | 210/243 |
| 5,019,256 A |   | 5/1991 | Ifill et al. | |
| 5,208,461 A | * | 5/1993 | Tipton | 250/436 |
| 5,368,826 A | * | 11/1994 | Weltz et al. | 422/243 |
| 5,418,370 A | * | 5/1995 | Maarschalkerweerd | 250/431 |
| 5,451,791 A | * | 9/1995 | Mark | 250/438 |
| 5,539,210 A | * | 7/1996 | Maarschalkerweerd | 250/372 |
| 5,564,765 A | * | 10/1996 | Schuerch et al. | 294/81.56 |
| 5,792,433 A | * | 8/1998 | Kadoya | 422/186.3 |
| 5,952,663 A | * | 9/1999 | Blatchley et al. | 250/435 |
| RE36,896 E | * | 10/2000 | Maarschalkerweerd | 422/186.3 |
| 6,193,939 B1 | * | 2/2001 | Kozlowski | 422/186.3 |

(Continued)

FOREIGN PATENT DOCUMENTS

DE    41 19 725 A1    1/1993

(Continued)

OTHER PUBLICATIONS

Patent Abstracts of Japan, vol. 1998, No. 09, Jul. 31, 1998, for abstract of Publication No. JP 10 085735, Publication Date Apr. 7, 1998.

(Continued)

*Primary Examiner*—Thomas M. Lithgow
(74) *Attorney, Agent, or Firm*—Katten Muchin Rosenman LLP

(57) ABSTRACT

A radiation source module comprising a support member, a radiation source assembly connected to the support member and a seal disposed on a first surface of the module, the seal operable to provide a substantially fluid tight seal between the first surface and a second surface which is adjacent to the first surface.

21 Claims, 10 Drawing Sheets

U.S. PATENT DOCUMENTS

| | | | |
|---|---|---|---|
| 6,342,188 B1 * | 1/2002 | Pearcey et al. | 422/186.3 |
| 6,500,346 B1 * | 12/2002 | Taghipour et al. | 210/748 |
| 6,565,757 B1 * | 5/2003 | Wedkamp | 210/748 |
| 6,576,189 B1 | 6/2003 | Wedekamp | |
| 6,646,269 B1 * | 11/2003 | Traubenberg et al. | 250/431 |
| 6,649,917 B2 * | 11/2003 | Perrin | 250/435 |
| 6,674,084 B2 * | 1/2004 | Sarchese et al. | 250/436 |
| 6,830,697 B1 * | 12/2004 | Pearcey | 210/748 |
| 6,956,220 B2 * | 10/2005 | Traubenberg et al. | 250/432 R |

FOREIGN PATENT DOCUMENTS

| | | | |
|---|---|---|---|
| WO | 99/13975 | * | 3/1999 |
| WO | 99/14161 | * | 9/1999 |
| WO | WO 00/75080 A1 | | 12/2000 |

OTHER PUBLICATIONS

Patent Abstracts of Japan, vol. 1997, No. 01, Jan. 31, 1997 for abstract of Publication No. JP 08 243555A, Publication Date Sep. 24, 1996.

* cited by examiner

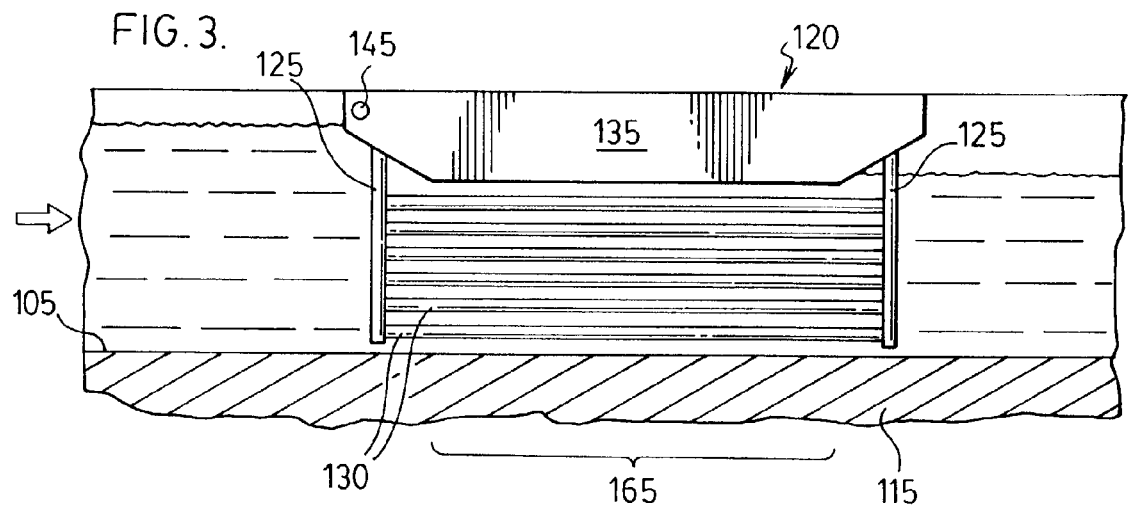
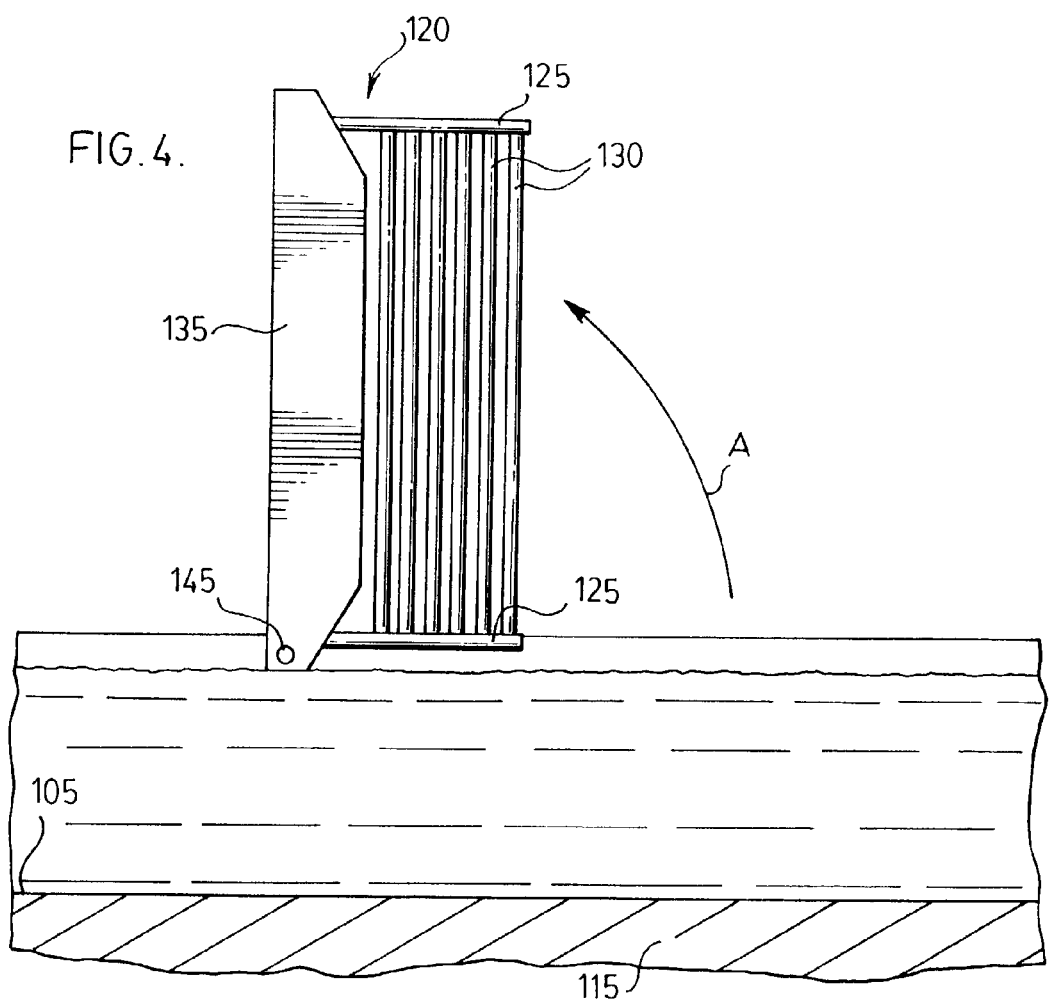

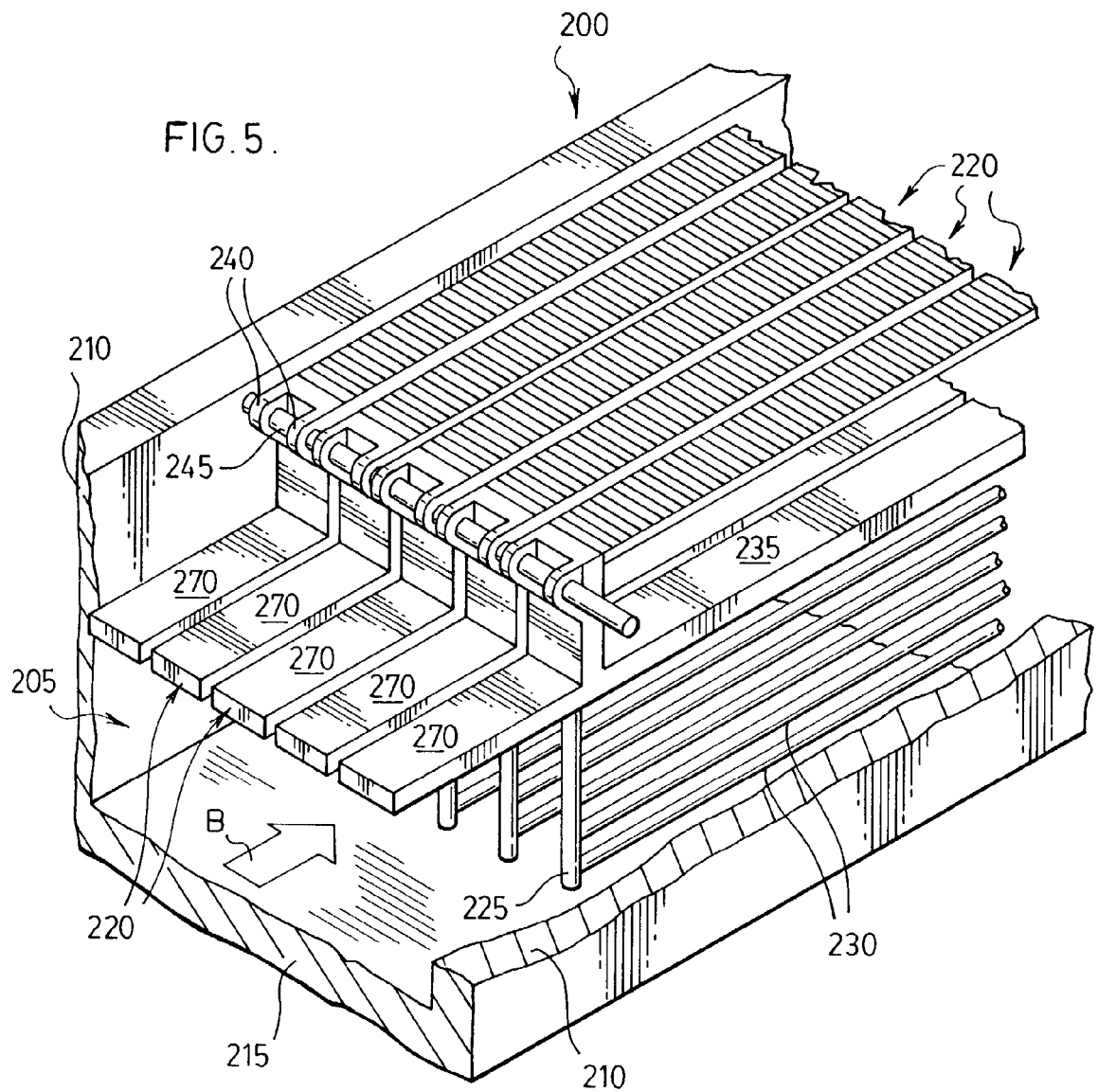

FLUID TREATMENT SYSTEM AND RADIATION SOURCES MODULE FOR USE THEREIN

CROSS-REFERENCE TO RELATED APPLICATION

The present application claims the benefit under 35 U.S.C. §119(e) of provisional patent application Ser. No. 60/255,384, filed Dec. 15, 2000, the contents of which are hereby incorporated by reference.

BACKGROUND OF THE INVENTION

1. Field of the Invention

In one of its aspects, the present invention relates to a radiation source module, particularly an ultraviolet radiation source module. In another of its aspects, the present invention relates to a fluid treatment system, more particularly, an ultraviolet radiation water treatment system.

2. Description of the Prior Art

Fluid treatment systems are generally known in the art. More particularly, ultraviolet (UV) radiation fluid treatment systems are generally known in the art. Early treatment systems comprised a fully enclosed chamber design containing one or more radiation (preferably UV) lamps. Certain problems existed with these earlier designs. These problems were manifested particularly when applied to large open flow treatment systems which are typical of larger scale municipal waste water or potable water treatment plants. Thus, these types of reactors had associated with them the following problems:

relatively high capital cost of reactor;

difficult accessibility to submerged reactor and/or wetted equipment (lamps, sleeve cleaners, etc);

difficulties associated with removal of fouling materials from fluid treatment equipment; and/or full redundancy of equipment was required for maintenance of wetted components (sleeves, lamps and the like).

The shortcomings in conventional closed reactors led to the development of the so-called "open channel" reactors.

For example, U.S. Pat. Nos. 4,482,809, 4,872,980 and 5,006,244 (all in the name of Maarschalkerweerd and all assigned to the assignee of the present invention and hereinafter referred to as the Maarschalkerweerd #1 Patents) all describe gravity fed fluid treatment systems which employ ultraviolet (UV) radiation.

Such systems include an array of UV lamp modules (e.g., frames) which include several UV lamps each of which are mounted within sleeves which extend between and are supported by a pair of legs which are attached to a cross-piece. The so-supported sleeves (containing the UV lamps) are immersed into a fluid to be treated which is then irradiated as required. The amount of radiation to which the fluid is exposed is determined by the proximity of the fluid to the lamps, the output wattage of the lamps and the flow rate of the fluid past the lamps. Typically, one or more UV sensors may be employed to monitor the UV output of the lamps and the fluid level is typically controlled, to some extent, downstream of the treatment device by means of level gates or the like.

The Maarschalkerweerd #1 Patents teach fluid treatment systems which were characterized by improved ability to extract the equipment from a wetted or submerged state without the need for full equipment redundancy. These designs compartmentalized the lamp arrays into rows and/or columns and were characterized by having the top of the reactor open in a free-flowing "top open" channel.

The fluid treatment system taught in the Maarschalkerweerd #1 Patents were characterized by having a free fluid flowing surface (typically the top fluid surface was not purposely controlled or constrained). Thus, the systems would typically follow the behaviour of open channel hydraulics. Since the design of the system inherently comprised a free flowing fluid surface, there were constraints on the maximum flow each lamp or lamp array could handle before either one or other hydraulically adjoined arrays would be adversely affected by changes in water elevation. At higher flows or significant changes in the flow, the unrestrained or free flowing fluid surface would be allowed to change the treatment volume and cross-sectional shape of the fluid flow, thereby rendering the reactor relatively ineffective. Provided that the power to each lamp in the array was relatively low, the subsequent fluid flow per lamp would be relatively low. The concept of a fully open channel fluid treatment system would suffice in these lower lamp power and subsequently lower hydraulically loaded treatment systems. The problem here was that, with less powerful lamps, a relatively large number of lamps was required to treat the same flow. Thus, the inherent cost of the system would be unduly large and/or not competitive with the additional features of automatic lamp sleeve cleaning and large fluid volume treatment systems.

This led to the so-called "semi-enclosed" fluid treatment systems.

U.S. Pat. Nos. 5,418,370, 5,539,210 and Re36,896 (all in the name of Maarschalkerweerd and all assigned to the assignee of the present invention and hereinafter referred to as the Maarschalkerweerd #2 Patents) all describe an improved radiation source module for use in gravity fed fluid treatment systems which employ UV radiation. Generally, the improved radiation source module comprises a radiation source assembly (typically comprising a radiation source and a protective (e.g., quartz) sleeve) sealingly cantilevered from a support member. The support member may further comprise appropriate means to secure the radiation source module in the gravity fed fluid treatment system.

Thus, in order to address the problem of having a large number of lamps and the incremental high cost of cleaning associated with each lamp, higher output lamps were applied for UV fluid treatment. The result was that the number of lamps and subsequent length of each lamp was dramatically reduced. This led to commercial affordability of automatic lamp sleeve cleaning equipment, reduced space requirements for the treatment system and other benefits. In order to use the more powerful lamps (e.g. medium pressure UV lamps), the hydraulic loading per lamp during use of the system would be increased to an extent that the treatment volume/cross-sectional area of the fluid in the reactor would significantly change if the reactor surface was not confined on all surfaces, and hence such a system would be rendered relatively ineffective. Thus, the Maarschalkerweerd #2 Patents are characterized by having a closed surface confining the fluid being treated in the treatment area of the reactor. This closed treatment system had open ends which, in effect, were disposed in an open channel. The submerged or wetted equipment (UV lamps, cleaners and the like) could be extracted using pivoted hinges, sliders and various other devices allowing removal of equipment from the semi-enclosed reactor to the free surfaces.

The fluid treatment system described in the Maarschalkerweerd #2 Patents were typically characterized by relatively short length lamps which were cantilevered to a substantially vertical support arm (i.e., the lamps were supported at one end only). This allowed for pivoting or other extraction of the lamp from the semi-enclosed reactor. These significantly shorter and more powerful lamps inherently are characterized by being less efficient in converting electrical energy to UV energy. The cost associated with the equipment necessary to physically access and support these lamps was significant.

The Maarschalkerweerd #1 and #2 Patents represent significant advances in the art of fluid treatment, particularly ultraviolet radiation treatment of water. Despite these advances, there is still room for improvement. Over time, the technology underlying UV light sources or lamps has advanced. Specifically, lamp manufacturers are developing more powerful lamps which are also more electrically efficient than medium pressure lamps. These more efficient light sources are typically longer in actual length than the medium pressure lamps. In order to utilize such lamps, two problems must be addressed. First, since the lamps are longer, there is the need to be able to readily extract the lamps from the reactors without significantly increasing the cost of the fluid treatment system. Second, with more powerful and longer lamps, there is a danger that bulk fluid velocity could be in excess of what is acceptable in an open channel or free surface hydraulic reactor design.

Thus, it would be desirable to have a radiation source module and fluid treatment system which facilitated use of the relatively recently developed so-called "low pressure, high output" (LPHO) and/or amalgam lamps while allowing for ready extraction of the lamps from the fluid treatment system for servicing and the like and having the advantages of the fluid treatment system described in the Maarschalkerweerd #2 Patents.

SUMMARY OF THE INVENTION

It is an object of the present invention to provide a novel radiation source module which obviates or mitigates at least one of the above-mentioned disadvantages of the prior art.

It is an object of the present invention to provide a novel fluid treatment system which obviates or mitigates at least one of the above-mentioned disadvantages of the prior art.

Accordingly, in one of its aspects, the present invention provides a radiation source module comprising a support member, a radiation source assembly connected to the support member and a seal disposed on a first surface of the module, the seal operable to provide a substantially fluid tight seal between the first surface and a second surface which is adjacent to the first surface.

In another of its aspects, the present invention provides a radiation source module comprising a plurality of radiation sources, each radiation source: (i) having a concentric longitudinal axis in substantial parallel alignment with a concentric longitudinal axis of adjacent radiation sources, and (ii) being disposed at a predetermined distance from each adjacent radiation source to define a predetermined center-to-center distance between the concentric longitudinal axis of adjacent radiation sources, the radiation source module further comprising a confining element having a surface disposed at a distance from an adjacent radiation source which is equal to a predetermined fraction of the center-to-center distance.

In yet another of its aspects, the present invention provides a fluid treatment system comprising an open channel for receiving a flow of fluid, at least one radiation source module disposed in the channel, a surface of the at least one radiation source module confining fluid to be treated in a closed fluid treatment zone, the radiation source module comprising at least one radiation source assembly disposed in the fluid treatment zone.

In yet another of its aspects, the present invention provides a fluid treatment system comprising an open channel for receiving a flow of fluid, a confining element moveable between a first position to define a closed zone and a second position to define an open zone, and at least one radiation source module disposed in the channel and having at least one radiation source element, at least a portion of the radiation source element being disposed in the closed zone.

Thus, the present inventors have discovered a fluid treatment system having the advantages of the system described in the Maarschalkerweerd #2 Patents while being relatively easy to implement in an open channel such as the one set out in the Maarschalkerweerd #1 Patents. Additionally, the present fluid treatment system facilitates incorporation of multiple banks (e.g., serially disposed) of radiation source modules (e.g., incorporating LPHO-type or other radiation lamp). Further, the present fluid treatment system allows for closer spacing of radiation sources—this is desirable to treat low grade fluids. Still further, the present fluid treatment system facilitates incorporation of mixers or mixing elements to facilitate fluid treatment. Effectively, in the present fluid treatment system, a confining element is provided and is movable between a first position wherein fluid flow passing through the fluid treatment system is confined in a relatively closed-cross section, whereas fluid flow substantially upstream and substantially downstream of the confining element is a so-called open flow (i.e., not constrained on all sides).

Throughout the specification, reference is made to terms such as "closed zone", "closed cross-section" and "constrained". In essence, these terms are used interchangeably and are intended to encompass a structure which effectively surrounds the fluid flow in a manner similar to that described in the Maarschalkerweerd #2 Patents. In the case of the present fluid treatment system, in one embodiment, the confining element is provided by a combination of adjacently disposed radiation source modules each radiation source module having its own so-called confining element such that, in combination, an overall confining element is provided in the open channel.

Further, as used throughout this specification, the term "module" is used in connection with a radiation source module and a spacer module, and is intended to encompass a structure capable of being used as a repeating unit in an overall system such as a fluid treatment system. Still further, as used throughout this specification, the term "fluid" is intended to have a broad meaning and encompasses liquids and gases. The preferred fluid for treatment with the present system is a liquid, preferably water (e.g., wastewater, industrial effluent, reuse water, potable water and the like).

Those with skill in the art will recognize that there is reference throughout the specification to the use of seals and the like to provide a practical fluid seal between adjacent radiation source modules and spacer modules (if present). It will be clear to those of skill in the art that an absolute fluid tight seal is not required to gain the benefits of the present fluid treatment system and that a small amount of leakage may occur (e.g., in the event of such leakage, it is a simple matter to recycle leaked fluid to the flow of fluid). Notwithstanding such small amount of leakage, the confining element serves its function, namely to substantially surround, constrain, confine, encase, etc. the flow of fluid in an area in which at least a portion of the radiation sources are disposed.

BRIEF DESCRIPTION OF THE DRAWINGS

Embodiments of the present invention will be described with reference to the accompanying drawings, wherein like numerals designate like elements, and in which:

FIGS. 3 and 4 illustrate side elevations, in cross-section, of the radiation source module illustrated in FIG. 1 in operation and in the extracted position;

FIG. 5 illustrates a perspective view of second embodiment of the present radiation source module and fluid treatment system;

FIG. 12 illustrates an enlarged view of the portion of the fluid treatment system in FIG. 10 about which radiation modules are pivoted to extract same for servicing and the like.

DETAILED DESCRIPTION OF THE PREFERRED EMBODIMENTS

Figure 1:
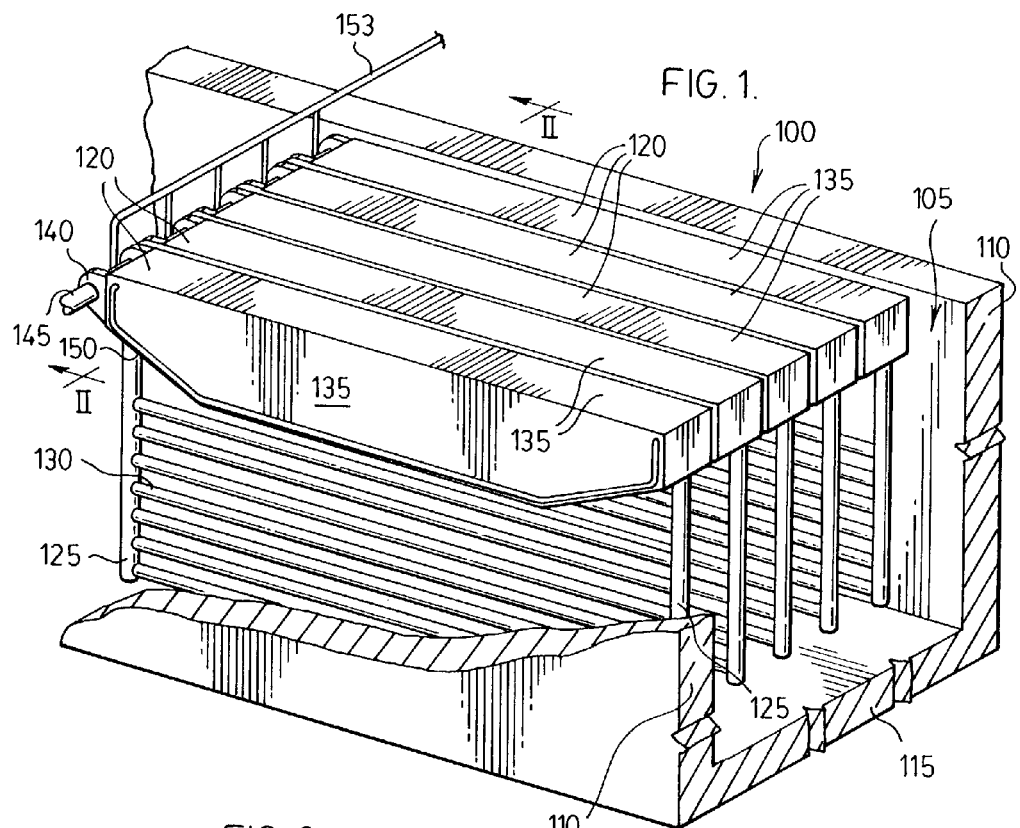
FIG. 1 illustrates a perspective view, and partial cross-section of a first embodiment of the present radiation source module and fluid treatment system.

Thus, with reference to FIGS. 1-4, there is illustrated a fluid treatment system 100 which comprises an open channel 105. Open channel 105 comprises a pair of side walls 110 and a bottom 115.

Disposed in channel 105 are a series of radiation source modules 120. Each radiation source module 120 comprises a pair of support legs 125. Disposed between pairs of support legs 125 in a given module are a series of radiation transparent protective sleeves 130. Disposed within each protective sleeve 130 is a radiation source lamp (not shown) such as a LPHO ultraviolet radiation lamp. The details for connecting sleeve 130 to support legs 125 in a fluid tight manner is conventional—see, for example, the Maarschalkerweerd #1 and #2 Patents, other patents assigned to Trojan Technologies Inc. and the like.

For a given radiation source module 120, each pair of support legs 125 is connected by a cross-piece 135. At one end of each cross-piece 135 is disposed an eyelet member 140. A pivot rod 145 is connected to each side wall 110 of channel 105 and is passed through eyelet member 140 of each radiation source module 120.

Figure 2:
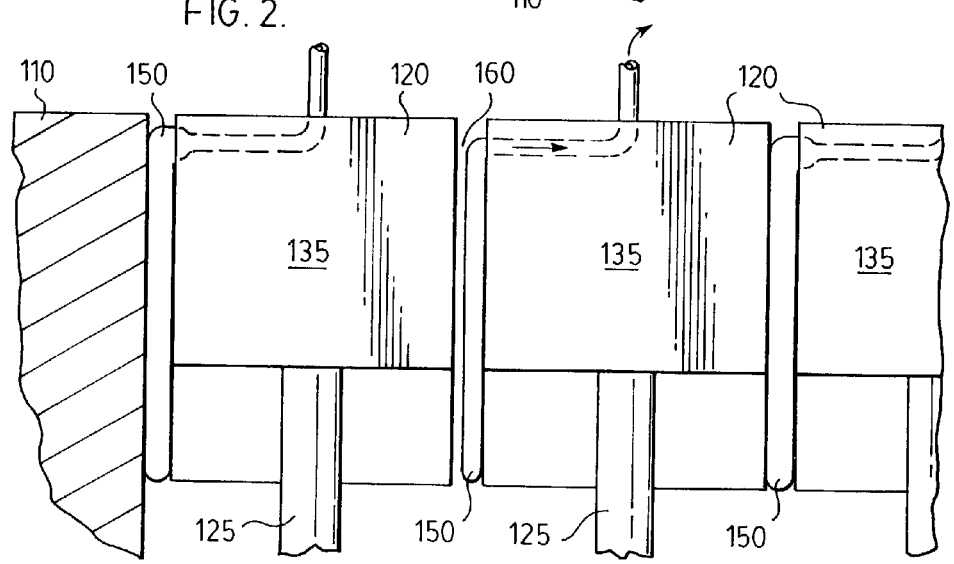
FIG. 2 illustrates a sectional view along line II-II in FIG. 1.

With particular reference to FIGS. 1 and 2, each radiation source module 120 comprises an expandable seal 150. Each expandable seal 150 is connected to a common line 155. Common line 155 is connected to a source of fluid (not shown) such as air or water.

With further reference to FIG. 2, it will be seen that expandable seal 150 is reversibly expandable between a first position wherein the seal is expanded in an fluid tight connection is made between adjacent radiation source modules 120 and/or wall 110 of channel 105, and a second position wherein second expandable seal 150 is relatively unexpanded to define a gap 160 between adjacent radiation source modules 120 and/or wall 110 of channel 105. It will be understood by those of skill in the art that one of the radiation source modules 120 adjacent to either walls 110 will comprise a pair of expandable seals 150 on either side of cross-piece 135. The remaining radiation source module 120 will include a single expandable seal 150.

With particular reference to FIGS. 1 and 3, fluid treatment system 100 is shown as in operation. Thus, each radiation source module 120 is immersed in channel 105 and all of the expandable seals 150 are operated in the first (expanded) position whereby a substantially fluid tight seal is achieved between adjacent radiation source modules 120 and walls 110 of channel 105. By this arrangement, there is defined a substantially closed cross-section fluid treatment zone 165 which is similar to the design of the fluid treatment zone in the Maarschalkerweerd #2 Patents. The difference here is that a surface of the closed fluid treatment zone is defined by a removable radiation source module and the radiation source module comprises relatively long radiation sources.

FIG. 4 illustrates radiation source module 120 in the extracted position wherein components thereof may be serviced. Initially, expandable seal 150 (not shown in FIG. 4 for clarity; refer to FIG. 2) of radiation source module 120 to be extracted is deflated to the second (unexpanded) position. To achieve the extracted position, radiation source module 120 is swung generally in the direction of arrow A whereby radiation source module 120 pivots about pivot rod 145. In this position, it is possible to service a single radiation source module while leaving the other modules in place and the system operational. Alternatively, it is possible to swing all radiation source modules into the extracted position for servicing at the same time.

Figure 6:
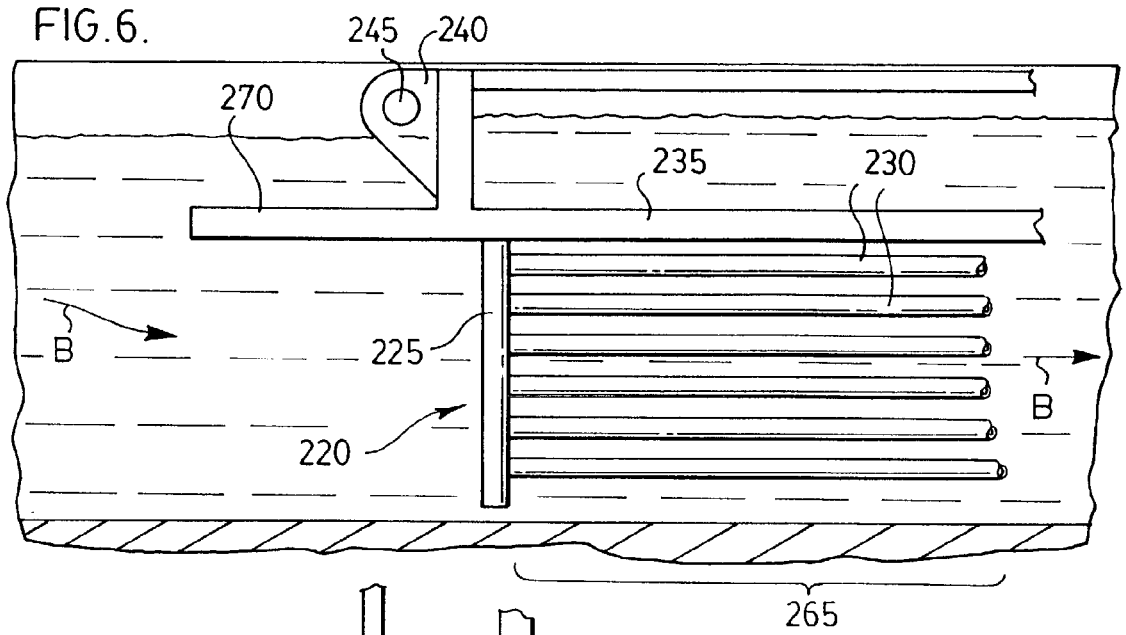
FIGS. 6 and 7 illustrate side elevations, in cross-section, of the radiation source module illustrated in FIG. 5 in operation and in the extracted position.
Figure 7:
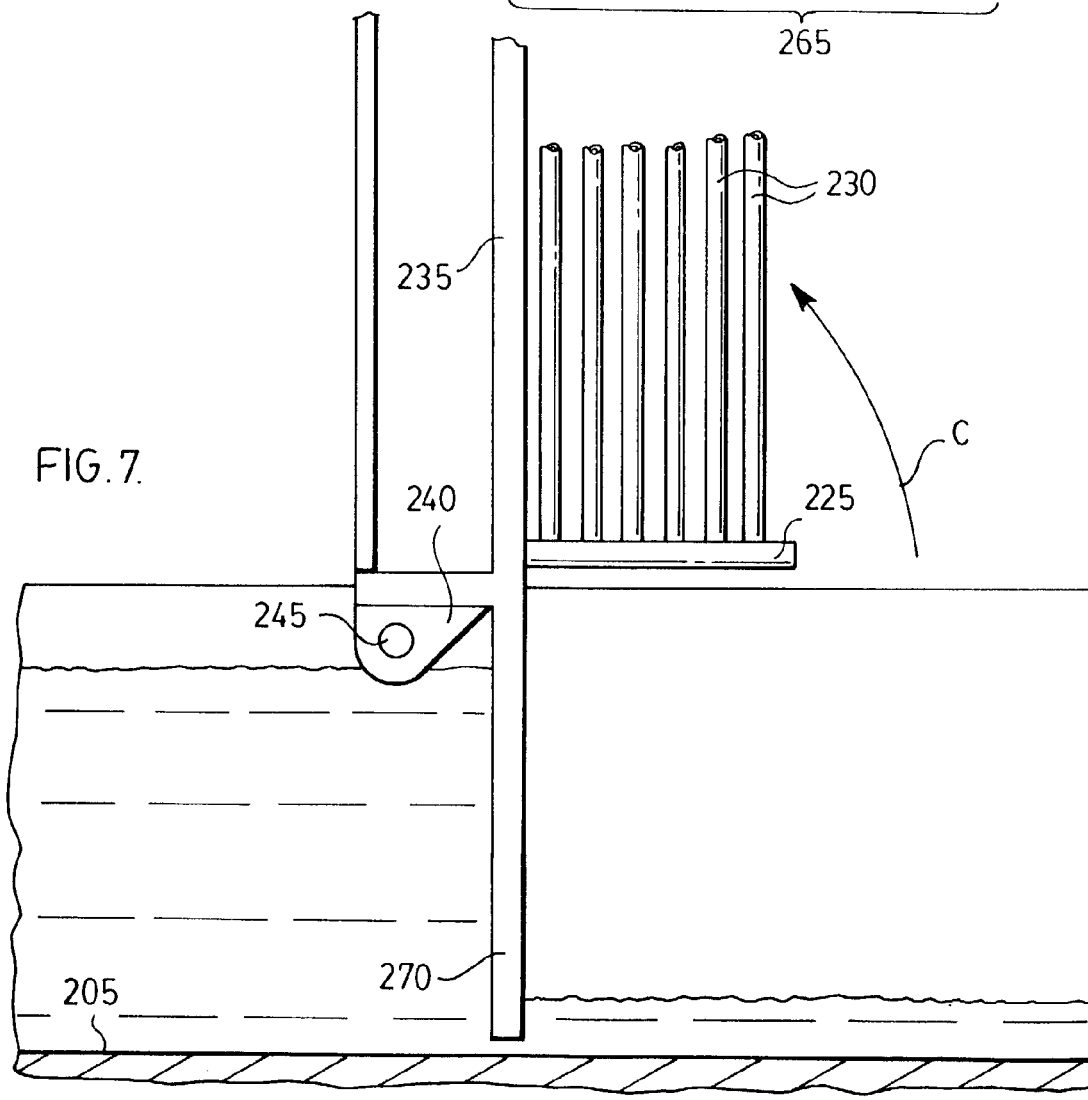

With reference to FIGS. 5-7, a second embodiment of the present radiation source module and fluid treatment system is illustrated. Thus, there is illustrated a fluid treatment system 200 comprising an open channel 205. Open channel 205 comprises a pair of side walls 210 and a bottom 215.

Disposed within channel 205 are a series of radiation source modules 220. Each radiation source module comprises a pair of support legs 225 (in FIGS. 5-7, only one of the two support legs 225 for each radiation source module 220 is illustrated). For a given radiation source module 220, disposed between each pair of support legs 225 is a series of radiation transparent protective sleeves 230. Disposed within each protective sleeve 230 is at least one radiation source such as a LPHO ultraviolet radiation lamp (not shown).

Each pair of support legs 225 is connected by a cross-piece 235.

For each radiation source module 220, there is also provided at one end thereof a pair of eyelet members 240. A pivot rod 245 is disposed between side walls 210 and through each eyelet member 240 of each radiation source module 220.

While not specifically illustrated, each radiation source module 220 comprises an expandable seal such as that described above with reference to the embodiment described above and illustrated and in FIGS. 1-4.

Radiation source module 220 further comprises an extension piece 270. Extension piece 270 preferably is of substantially the same length as each of support legs 225.

With particular reference to FIGS. 6 and 7, operation of fluid treatment system 200 will be described.

FIG. 6 illustrates radiation source module 220 in the operative position. Thus, each expandable seal (not shown) on radiation source module 220 is in the first (expanded) position thereby creating a substantially fluid tight seal between adjacent radiation source modules 220 and walls 210 of open channel 205. Fluid (typically water) travelling in the direction of arrow B is forced to pass under extension member 270 and cross-piece 235 such that a fluid treatment zone 265 is defined and has a closed cross-section.

With reference to FIG. 7, when servicing is required, radiation source module 220 is swung in the direction of arrow C whereby it pivots about pivot rod 245. This results in a swinging down of extension member 270. As will be appreciated by those of skill in the art, a radiation source module 220 disposed in this position will effectively divert the flow of fluid past adjacent radiation source modules in open channel 205 with the result that the throughput of fluid in system 200 will be reduced thereby mitigating or obviating passage of some untreated fluid. Those of skill in the art will recognize that, when a radiation source module 220 is disposed in the position illustrated in FIG. 7, the fluid level downstream of extension member 270 will vary depending on factors such as the total number of modules in open channel 205, the number of modules which are swung upward, the spacing between adjacent sources and the like.

With reference to FIGS. 8-12, a third embodiment of the present radiation source module and fluid treatment system is illustrated. Thus, there is illustrated a fluid treatment system 300 comprising an open channel 305. Open channel 305 comprises a pair of side walls 310 and a bottom 315.

Disposed within channel 305 are a series of radiation source modules 320. Each radiation source module 320 comprises a pair of support legs 325. For a given radiation source module 320, disposed between each pair of support legs 325 is a series of radiation transparent protective sleeves 330. Disposed within each protective sleeve 330 is at least one radiation source (not shown for clarity), such as a LPHO (or other) ultraviolet radiation lamp.

Connected to each support leg 325 is a cross-piece 335.

For each radiation source module 320, there is also provided, at one end thereof, a U-shaped bracket 340 having a pair of apertures through which a pivot rod 345 is disposed. As will be appreciate by those with skill in the art, by aligning adjacent radiation source modules 320, adjacent U-shaped bracket 340 will also be aligned allowing for placement of pivot rod 345 through all U-shaped brackets 340. Preferably, radiation source module 320 is equipped with a lock down or similar device (not shown) for securing the radiation source module in place under flow conditions in the open channel. The precise nature of the lock down or similar device is not particularly restricted, and can be incorporated in each module or can be an independent structure which releasably engages one or more radiation source modules 320.

Disposed between adjacent radiation source modules 320 is a spacer module 350. Spacer module 350 comprises a pair of seals 352 on opposed surfaces thereof. As shown particularly in FIG. 9, seals 352 contact cross-piece 335 of each radiation source module 320 adjacent to a given spacer module 350. As shown in FIG. 10, spacer module 350 is supported on a rod 351 at one end thereof and on pivot rod 345 at an opposite end thereof. Preferably, the distal end of spacer module 350 is releasably engaged to rod 351.

Figure 8:
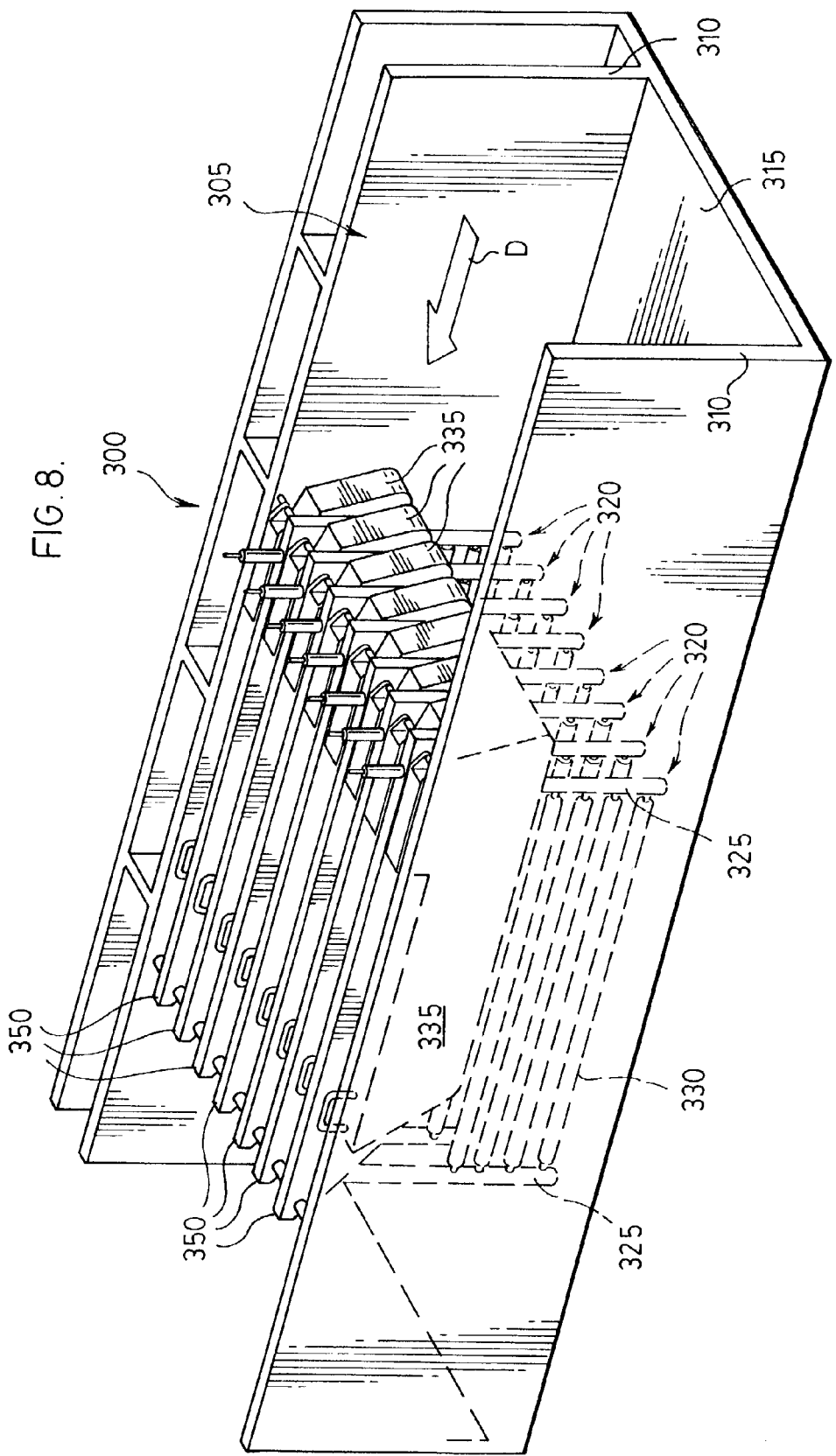
FIG. 8 illustrates a perspective view of a third embodiment of the present radiation source module and fluid treatment system.
Figure 9:
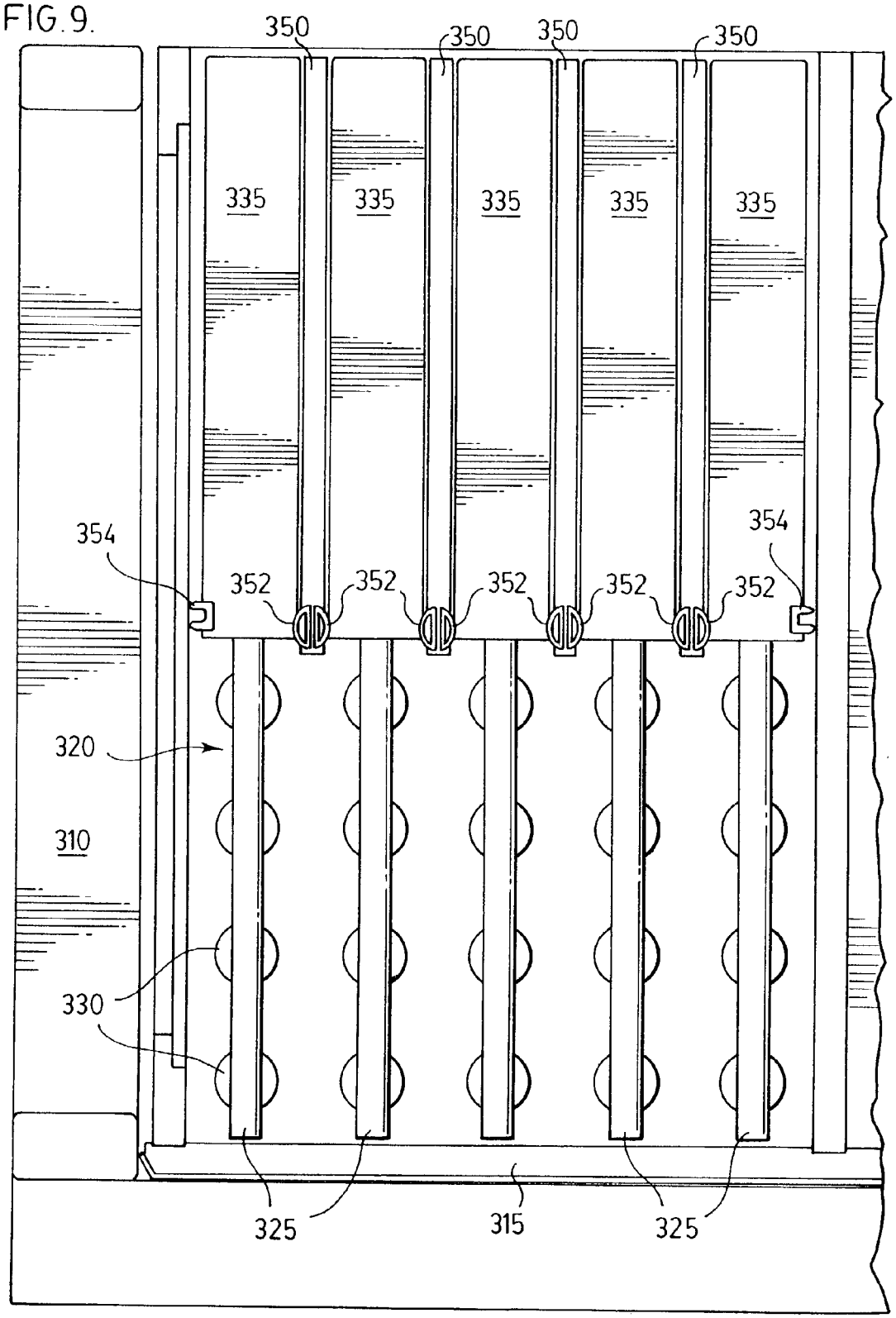
FIG. 9 illustrates an end of the fluid treatment system illustrated in FIG. 8 (showing fewer modules for clarity purposes only)
Figure 10:
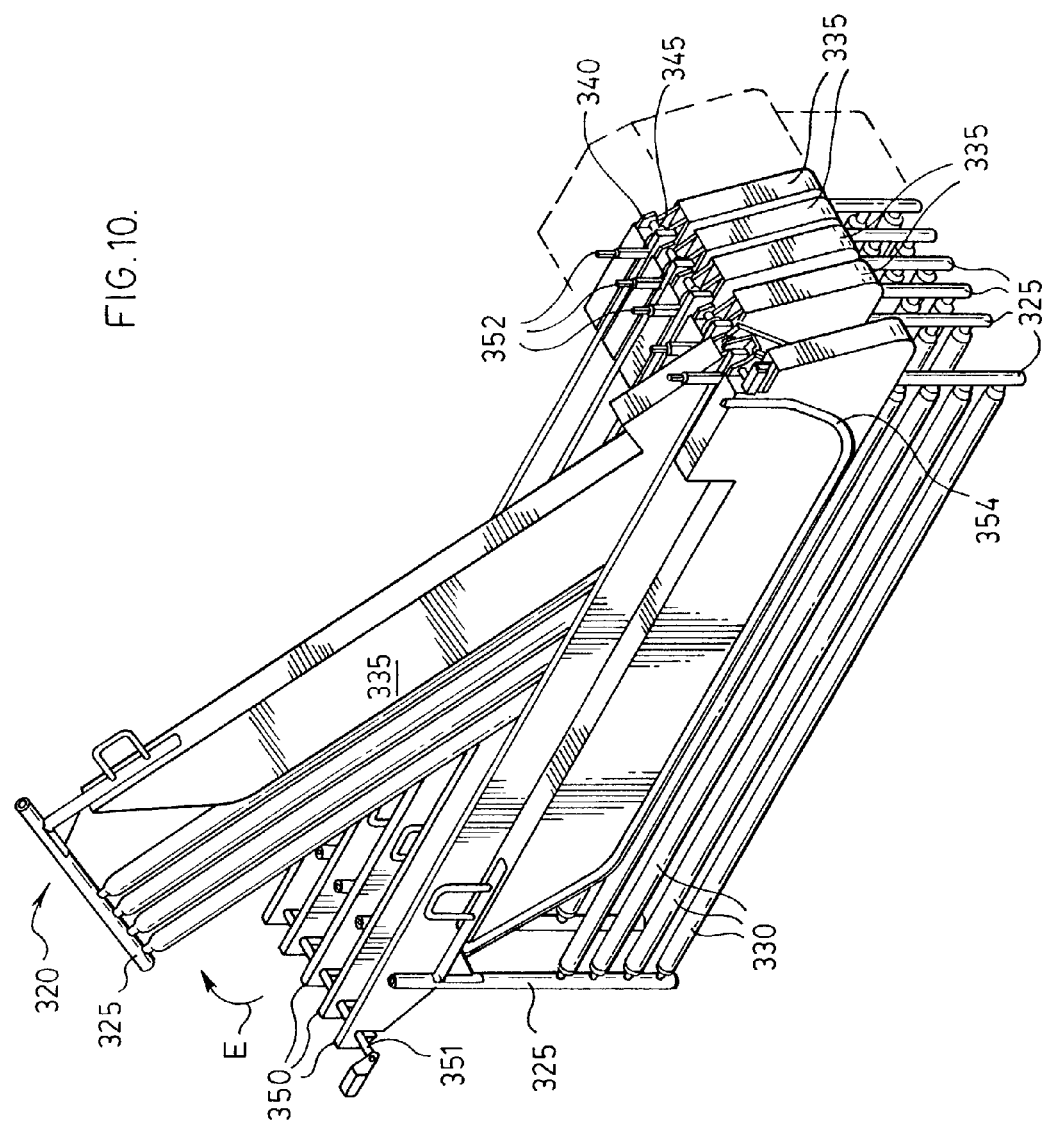
FIG. 10 illustrates a perspective view of a portion of the fluid treatment system illustrated in FIG. 8 with one of the radiation source modules in the extracted position.

As will be appreciated by those of skill in the art, an advantage of the embodiment shown in FIGS. 8-12 is that very few seals need to be provided on each radiation source module 320 (compared with the embodiment described herein above with reference to FIGS. 1-4). Specifically, in an array of adjacent radiation source modules 320, it is only the outer surface of cross-piece 335 in the outer radiation source modules which needs to be provided with a seal—this is shown in FIG. 9 with reference to seal 354.

With further reference to FIGS. 8-12, operation of the fluid treatment system 300 will be described.

FIG. 8 illustrates fluid treatment system 300 in the fully operative position (all of radiation source modules 320 are in place). Thus, seals 352 on opposed sides of each spacer module 350 provide a substantially fluid tight seal between cross-pieces 335 of each radiation source module 320 along at least a portion, preferably along substantially the entire length, of cross-pieces 335. Further, seal 354 on the outer surface of each cross-piece 335 on each of the outermost radiation source modules 320 provides a substantially fluid tight seal between side wall 310 and cross-piece 335 on each of the outermost radiation source modules 320. The result of this is the provision of a substantially closed fluid treatment zone (or closed zone) in the area of open channel 305 below adjacent cross-pieces 335 of radiation source modules 320.

Figure 11:
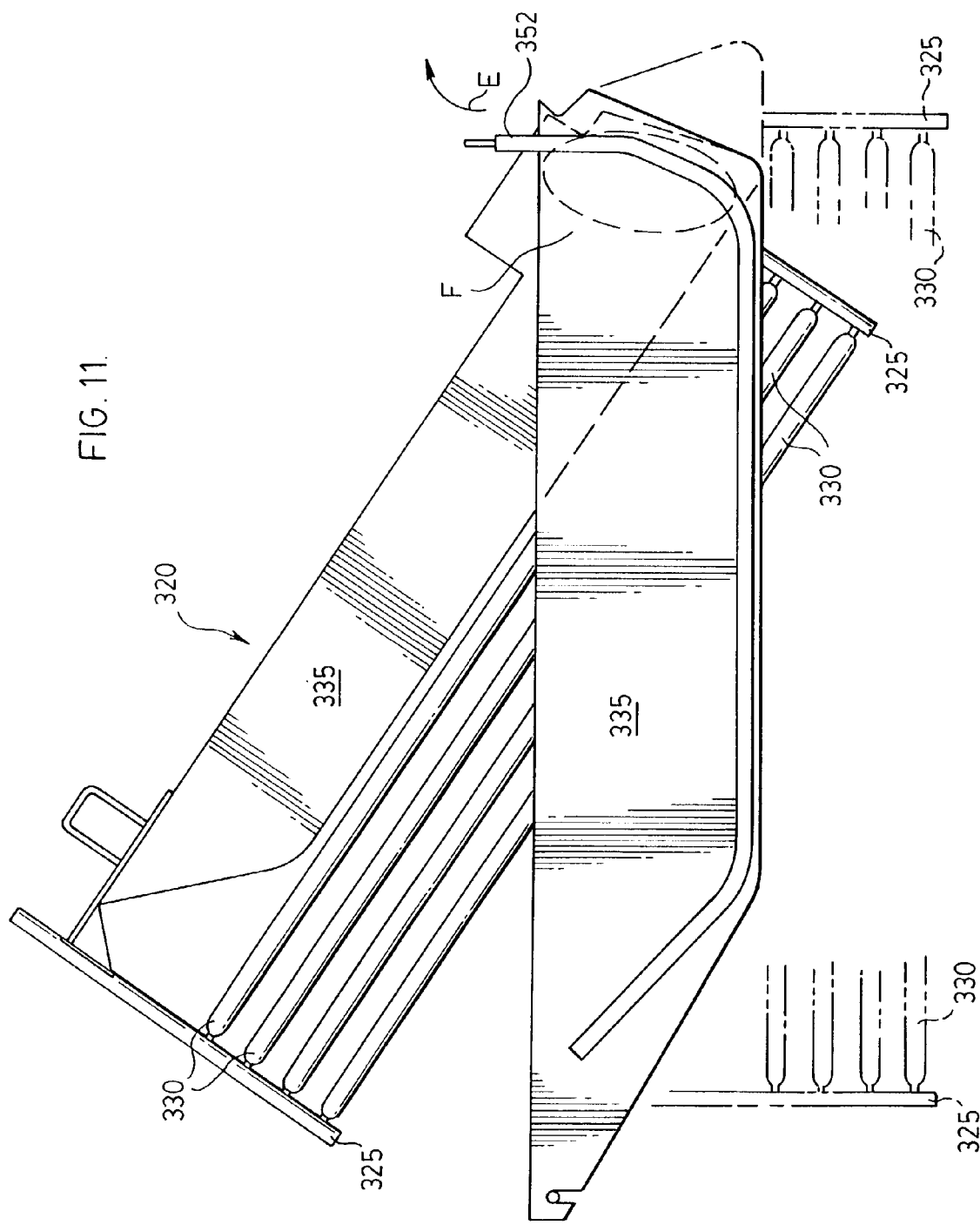
FIG. 11 illustrates a side elevation view of a portion of the fluid treatment system illustrated in FIG. 8 with one of the radiation source modules in the extracted position.
Figure 12:
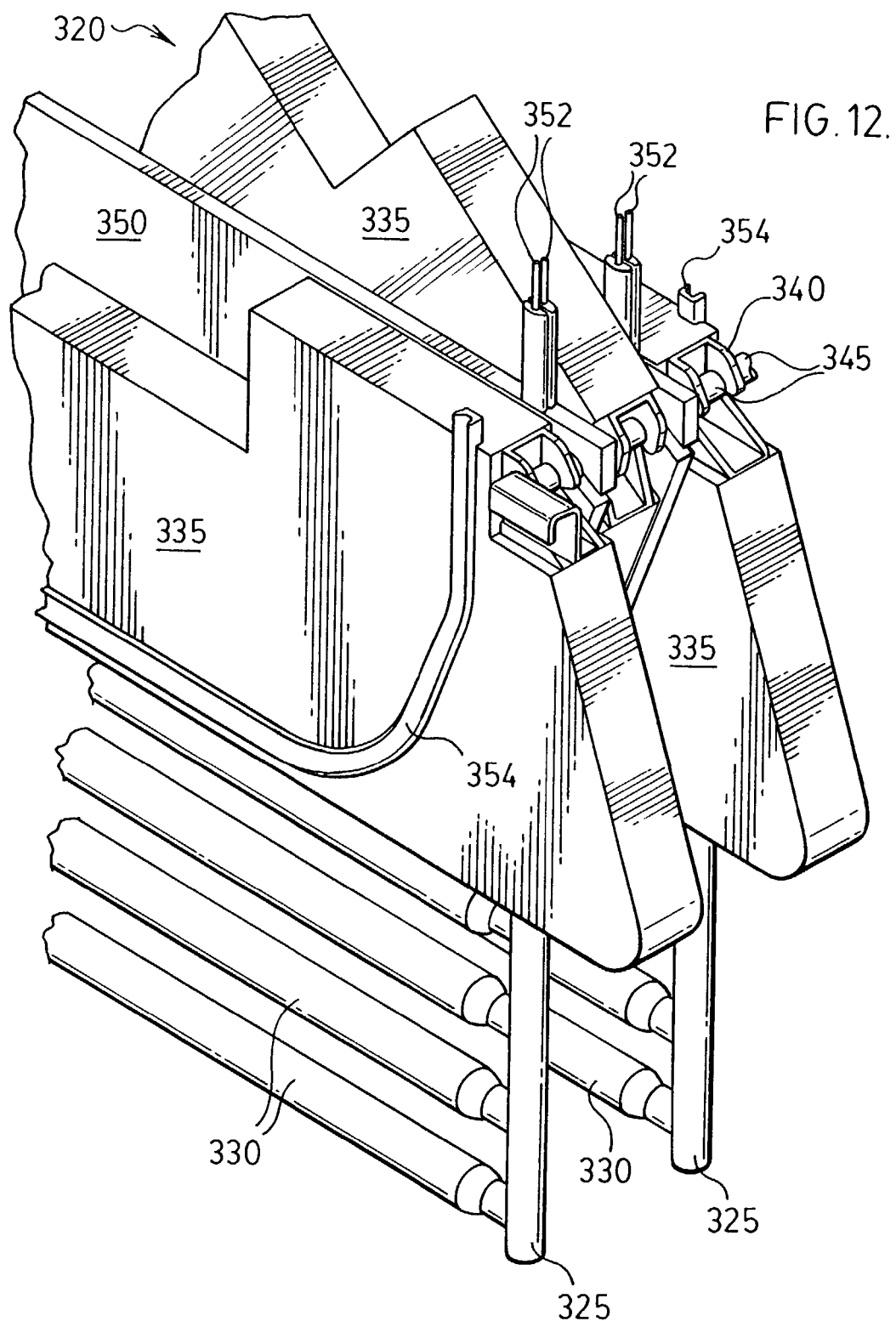

With reference to FIGS. 10-12, when servicing is required, a radiation source module 320 is swung in the direction of arrow E whereby it pivots about pivot rod 345. As will be seen with particular reference to FIG. 11, radiation source module 320 which is partially swung up still has a portion of cross-piece 335 in sealing engagement with the adjacent spacer module 350 (not shown for clarity) in region F. This preserves the substantially fluid tight seal at the proximal region of the collection of cross-pieces 335 in the array of radiation source modules 320. This is an advantage of radiation source module 320 and spacer module 350.

Figure 13:
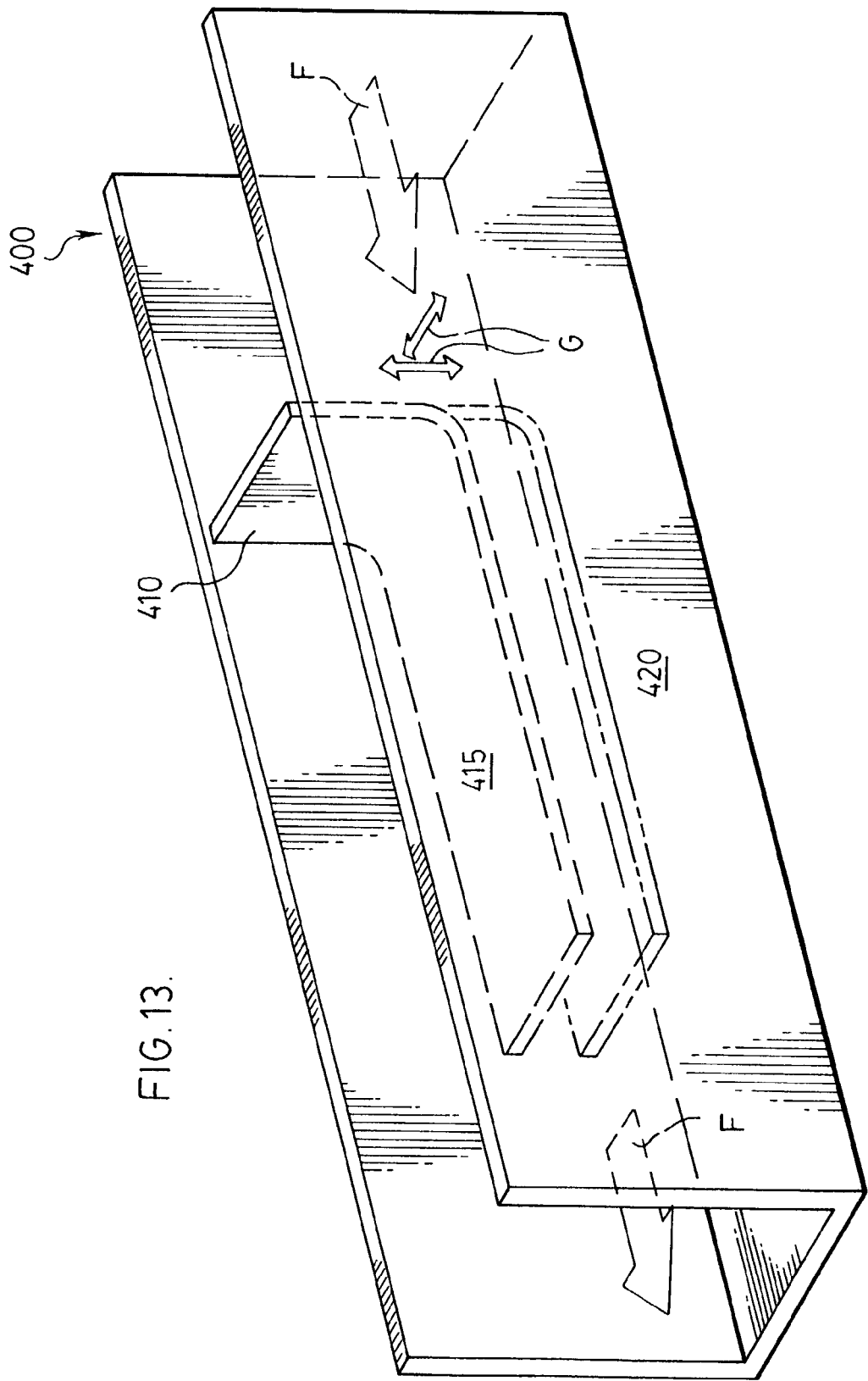
FIG. 13 illustrates a schematic view of a preferred mode of implementing the present invention.

With reference to FIG. 13, there is shown a schematic illustration of an alternate means by which conversion of a portion of an open channel to a closed cross-section may be achieved. Thus, in the embodiments illustrated in FIGS. 1-12 above, the substantially closed cross section used to define the fluid treatment zone was achieved by rotating or pivoting radiation source modules (with or without the presence of spacer modules) into place. As shown in FIG. 13, an open channel 400 receives a flow of fluid having the direction of arrow F. A confining element 410 is reversibly movable in the direction of arrow G. The radiation sources are not shown for clarity but would be disposed between a surface 415 of confining element 410 and a bottom surface 420 of open channel 400. FIG. 13 illustrates one embodiment of how the confining element is moved (linear or sliding translation) into place to define the closed zone (or closed fluid treatment zone). However, it is not particularly restricted to this embodiment and movement of confining element 410 may be achieved in other ways such as rotation or other means.

Throughout the specification, reference in general terms and in relation to the specifically illustrated embodiments has been made to the provision of seals between adjacent radiation source modules and spacer modules (if present). The precise nature of these seals is not particularly restricted provided that they achieve the goals set out in the present specification. Thus, for example, in one embodiment, the seal may be a so-called "contact seal". Examples of suitable contact seals may include magnetic seals, electromagnetic seals, pneumatic seals, hydraulic seals, mechanical seals, hydrostatic seals and the like. Alternatively, in another embodiment, the seals may be non-contact seals which do not involve physical contact of two surfaces but, rather, cause a resistance to flow based upon a pressure difference across the opening. Examples of such seals are so-called narrow gap seals, labyrinth seals, fluidic seals, electric seals and the like. The preferred seals for use in the present fluid treatment system are contact seals. Of course, combinations of various seals can be used and are included within the scope of the present invention.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, it is possible to dispose the ballast or other power supply for the radiation sources in the radiation source module (e.g., in cross-piece 135 of radiation source module 120) as described generally in various of the Maarschalkerweerd #1 Patents described above. Further, it is possible to incorporate a mechanical or chemical/mechanical cleaning system in the radiation source module as described various published patent applications and issued patents of Trojan Technologies Inc. Still further, it is possible to modify the illustrated embodiments such that support leg 125 rests on bottom 115 of open channel 105. Still further, while each of the specifically illustrated embodiments is directed to a fluid treatment system wherein the radiation sources have a longitudinal axis which is oriented substantially parallel to the direction of fluid flow in the channel, those of skill in the art will understand that it is possible to modify the illustrated embodiments such that the radiation sources have a longitudinal axis which is oriented such that it is transverse to the fluid flow. This can be achieved by orienting the longitudinal axis of the radiation sources substantially perpendicular (e.g., horizontally perpendicular or vertically perpendicular) or otherwise angled (e.g., horizontally angled or vertically angled) with respect to the direction of fluid flow. Still further, as described above, the specific embodiments illustrated can be modified to use alternate sealing systems which are inflatable or non-inflatable and made of a variety of materials. The selection of sealing materials and the placement thereof to obtain a sufficient seal is not particularly restricted. The important feature is that the combination of radiation source modules, seals and spacer modules (if present) operate collectively to provide a substantially fluid tight seal thereby defining a closed fluid treatment system having a zone which has substantially closed cross-section and in which is disposed at least a portion of at least one radiation source. Preferably, the substantially fluid tight seal may be achieved by an actuator which is capable of applying a lateral force to adjacent modules thereby creating the seal. Reversal of the actuator allows for servicing and/or extraction of one or more radiation source modules. Still further, it is possible to modify the illustrated embodiments to use weirs, dams and gates upstream, downstream or both upstream and downstream to optimize fluid flow upstream and downstream of the fluid treatment zone defined in the fluid treatment system of the present invention. Still further, it is possible to modify the illustrated embodiments to include sloped and/or stepped channel surfaces such as is disclosed in copending International patent application Ser. No. PCT/CA01/00297 filed on Mar. 12, 2001. Still further, it is possible to modify the illustrated embodiments to include mixers or mixing elements on the walls of the channel of the fluid treatment system and/or the radiation source module, for example as taught in one or more of U.S. Pat. Nos. 5,846,437, 6,015,229, 6,126,841 and 6,224,759, and in International patent application Ser. No. PCT/CA01/00816 filed on Jun. 6, 2001. Still further, it is possible to modify the illustrated embodiments to provide multiple banks of radiation source modules in hydraulic series. Still further, while the illustrated embodiments illustrate partial extraction of a single radiation source module in a bank of such modules, those of skill in the art will recognize that there might be situations where it is possible and/or desirable to fully extract, remove and replace one, some or all radiation source modules in a bank of such modules. Still further, while the illustrated embodiments utilize dams or inclined surfaces to funnel fluid flow upstream and downstream of the confining element, it is possible to utilize these dams or inclined surfaces only at the upstream or downstream side of the confining element. Of course, dams or inclined surfaces of different design can be used upstream and/or downstream of the confining element. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A radiation source module for treating a fluid having a fluid flow direction comprising:
    a frame comprising a first support member, a second support member opposed to the first support member and a third support member interconnecting the first support member and second support member,
    a radiation source assembly supported by the first support member and the second support member, and
    a seal disposed on a first surface of the third support member, substantially parallel to the fluid flow direction, the seal operable to provide a substantially fluid tight seal between the first surface and a second surface which is adjacent to the first surface.

2. The radiation source module defined in claim 1, wherein a power supply is disposed in the frame.

3. The radiation source module defined in claim 1, further comprising an extraction system for moving the module between an in-use and in-service position with respect to a fluid treatment system.

4. The radiation source module defined in claim 1, wherein the seal comprises an expandable seal.

5. The radiation source module defined in claim 1, wherein the seal comprises a deformable seal.

6. A fluid treatment system comprising:
    an open channel for receiving a flow of fluid, having a fluid flow direction, and
    at least one radiation source module disposed in the channel, a surface of the at least one radiation source module, in combination with the open channel, confining fluid to be treated in a closed fluid treatment zone,
    the radiation source module comprising: (i) a first support member, (ii) a second support member opposed to the first support member, (iii) a third support member interconnecting the first support member and second support member, (iv) at least one radiation source assembly disposed in the fluid treatment zone and supported by the first support member and the second support member and (iv) a seal disposed on a first surface of the third support member, substantially parallel to the fluid flow direction, the seal operable to provide a substantially fluid tight seal between the first surface and a second surface which is adjacent to the first surface.

7. The fluid treatment system defined in claim 6, comprising a plurality of radiation source modules in side-by-side arrangement.

8. The fluid treatment system defined in claim 6, wherein a power supply is disposed on one of the first, second, or third support members.

9. The fluid treatment system defined in claim 6, further comprising an extraction system for allowing movement of the module between an in-use and in-service position with respect to a fluid treatment system.

10. The fluid treatment system defined in claim 6, wherein the radiation source module further comprises a blocking plate which obstructs the open channel when the radiation source module is in an extracted position.

11. The fluid treatment system defined in claim 6, wherein the seal comprises an expandable seal.

12. The fluid treatment system defined in claim 6, wherein the seal comprises a deformable seal.

13. A fluid treatment system comprising:

an open channel for receiving a flow of fluid, a confining element having a pivot structure causing the confining element to be moveable during flow of fluid in the open channel by rotation or translation between a first position to define a closed zone and a second position to define an open zone, and at least one radiation source module disposed in the channel and having at least one radiation source element, at least a portion of the radiation source element being disposed in the closed zone when the confining element is in the first position.

14. The fluid treatment system defined in claim 13, wherein the confining element and the radiation source module are integral.

15. The fluid treatment system defined in claim 13, wherein the radiation source element comprises a longitudinal axis disposed substantially parallel to the direction of fluid in the open channel.

16. The fluid treatment system defined in claim 13, wherein the radiation source element comprises a longitudinal axis disposed transverse to the direction of fluid in the open channel.

17. The fluid treatment system defined in claim 14, comprising a plurality of radiation source modules disposed substantially adjacent to one another.

18. The fluid treatment system defined in claim 17, wherein at least one sealing element is disposed between adjacent pairs of the plurality of radiation source modules.

19. The fluid treatment system defined in claim 17, further comprising at least one spacer module disposed between adjacent pairs of the plurality of radiation source modules.

20. The fluid treatment system defined in claim 19, wherein the spacer module comprises a first seal disposed on the spacer module, the first seal arranged to provide a seal between the spacer module and a first adjacent radiation source module.

21. The fluid treatment system defined in claim 19, wherein the spacer module comprises a first seal and a second seal disposed on opposed sides of the spacer module, the first seal arranged to provide a seal between the spacer module and a first adjacent radiation source module, and the second seal capable arranged to provide a seal between the spacer module and a second adjacent radiation source module.

\* \* \* \* \*